US010744539B2

(12) United States Patent
Barclay et al.

(10) Patent No.: US 10,744,539 B2
(45) Date of Patent: Aug. 18, 2020

(54) OPTIMIZED-COVERAGE SELECTIVE LASER ABLATION SYSTEMS AND METHODS

(71) Applicant: The Boeing Company, Chicago, IL (US)

(72) Inventors: Richard Charles Barclay, Ladson, SC (US); Trent T. Weiss, Charlottesville, VA (US); Philip Lawrence Freeman, Summerville, SC (US)

(73) Assignee: The Boeing Company, Chicago, IL (US)

( * ) Notice: Subject to any disclaimer, the term of this patent is extended or adjusted under 35 U.S.C. 154(b) by 214 days.

(21) Appl. No.: 15/796,128

(22) Filed: Oct. 27, 2017

(65) Prior Publication Data

US 2019/0126328 A1 May 2, 2019

(51) Int. Cl.
*B08B 7/00* (2006.01)
*B23K 26/03* (2006.01)
*B23K 26/352* (2014.01)
*B23K 26/0622* (2014.01)
(Continued)

(52) U.S. Cl.
CPC .......... *B08B 7/0042* (2013.01); *B23K 26/032* (2013.01); *B23K 26/0622* (2015.10);
(Continued)

(58) Field of Classification Search
CPC .. B01J 19/121; B08B 2240/00; B08B 7/0042; B23K 26/032; B23K 26/0622;
(Continued)

(56) References Cited

U.S. PATENT DOCUMENTS

| 5,281,798 A | 1/1994 | Hamm et al. |
| 10,363,586 B2 | 7/2019 | Barclay |

(Continued)

FOREIGN PATENT DOCUMENTS

| WO | WO 03/103861 | 12/2003 |
| WO | WO 2004/060600 | 7/2004 |
| WO | WO 2015/107325 | 7/2015 |

OTHER PUBLICATIONS

F. Palmieri et al., Laser Ablation Surface Preparation for Adhesive Bonding of Carbon Fiber Reinforced Epoxy Composites, International Journal of Adhesion & Adhesives, vol. 68, pp. 95-101, Feb. 2016.

(Continued)

*Primary Examiner* — Douglas Lee
(74) *Attorney, Agent, or Firm* — Dascenzo Intellectual Property Law, P.C.

(57) ABSTRACT

Optimized-coverage selective laser ablation systems and methods may be utilized to prepare (ablate) a three-dimensional surface. Methods comprise receiving a 3D virtual model of the surface to be ablated, generating a preliminary ablation path, and optimizing the preliminary ablation path to produce an adapted ablation path. Methods may comprise ablating the surface according to the adapted ablation path. The preliminary ablation path may be based on scanning a laser sheet across a two-dimensional projection of the surface. The optimization may adjust one or more waypoints of the preliminary ablation path to achieve complete coverage of the surface at acceptable levels of ablation, with little to no ablation outside the surface, and with acceptable (e.g., at least locally minimal) time to ablate the surface.

20 Claims, 4 Drawing Sheets

(51) Int. Cl.
    *B23K 26/08*     (2014.01)
    *B23K 26/073*     (2006.01)
    *B23K 26/362*     (2014.01)
    *B23K 26/082*     (2014.01)
    *B23K 26/36*     (2014.01)
    *B01J 19/12*     (2006.01)

(52) U.S. Cl.
    CPC .......... *B23K 26/0732* (2013.01); *B23K 26/08* (2013.01); *B23K 26/082* (2015.10); *B23K 26/0884* (2013.01); *B23K 26/352* (2015.10); *B23K 26/36* (2013.01); *B23K 26/362* (2013.01); *B01J 19/121* (2013.01); *B08B 2240/00* (2013.01)

(58) Field of Classification Search
    CPC .. B23K 26/0732; B23K 26/08; B23K 26/082; B23K 26/0884; B23K 26/352; B23K 26/36; B23K 26/362
    See application file for complete search history.

(56) References Cited

U.S. PATENT DOCUMENTS

| | | |
|---|---|---|
| 2007/0000885 A1 | 1/2007 | Thomas et al. |
| 2008/0095968 A1 | 4/2008 | Semon |
| 2009/0007933 A1 | 1/2009 | Thomas et al. |
| 2017/0182722 A1* | 6/2017 | Matsumura .......... B23K 26/352 |
| 2017/0297198 A1* | 10/2017 | Lawrence, III .... B23Q 17/2233 |

OTHER PUBLICATIONS

EWI Presentation at MRO Americas 2015 Aviations Week, "Innovative De-Painting: The Laser Coating Removal Robot," Miami Beach Convention Center, Miami Beach, Florida, Apr. 15, 2015.
European Patent Office, Extended European Search Report for related European Application No. 18185869, dated Feb. 22, 2019.

* cited by examiner

OPTIMIZED-COVERAGE SELECTIVE LASER ABLATION SYSTEMS AND METHODS

FIELD

The present disclosure relates to optimized-coverage selective laser ablation systems and methods.

BACKGROUND

Laser ablation is a method to clean or refresh surfaces by applying laser energy to the surface to remove surface contaminants or layers. The laser is tuned to selectively ablate or remove surface contaminants or layers while leaving the underlying surface material intact. The effectiveness of laser ablation is substantially due to the laser energy absorbed at the surface. The proper amount of energy should be applied to ensure that the underlying surface remains intact while a sufficient amount of contaminants are removed.

The effectiveness of laser ablation is determined by factors such as the laser irradiance (surface density of laser power), the laser fluence (surface density of accumulated laser energy), the laser wavelength, material to be ablated (surface contaminants or layers), surface material, and surface shape. In particular for large surfaces and surfaces with significant 3D (three dimensional) shapes, a basic raster scan of the surface may produce areas that could potentially be over ablated or under ablated, for example due to a mismatch between the surface outline and the rectangular raster shape (e.g., not ablating edges of the surface or ablating support structure beyond the edges of the surface), shadowing by surface features (e.g., under ablating surface areas obscured by nearby protrusions, and/or non-uniform application of laser energy (e.g., over or under ablating a curved surface based on non-linear traversal time of the laser beam across the curved surface).

Hence, conventional laser ablation suffers from over ablation and under ablation, especially when the surface to be ablated becomes large relative to the width of the laser sheet and when the surface includes significant 3D features.

SUMMARY

Optimized-coverage selective laser ablation systems and methods may be utilized to prepare (ablate) a three-dimensional surface. Methods comprise receiving a 3D virtual model of the surface to be ablated, generating a preliminary ablation path, and optimizing the preliminary ablation path to produce an adapted ablation path. Methods may comprise ablating the surface according to the adapted ablation path. The preliminary ablation path may be based on scanning a laser sheet across a two-dimensional projection of the surface. The optimization may adjust one or more waypoints of the preliminary ablation path to achieve complete coverage of the surface at acceptable levels of ablation, with little to no ablation outside the surface, and with acceptable (e.g., at least locally minimal) time to ablate the surface.

Laser ablation systems comprise a laser, a laser scanning head, and a laser positioning apparatus. Laser ablation systems also include a controller that is generally configured to control the laser, the laser scanning head, and/or the laser positioning apparatus. The laser is configured to emit a laser beam that is delivered by the laser scanning head as a laser sheet to the surface to be ablated. The laser positioning apparatus is configured to the relative position and/or orientation of the laser sheet and the surface. The controller is programmed to receive a 3D virtual model of the surface, to generate a preliminary ablation path, to optimize the preliminary ablation path to produce an adapted ablation path, and to ablate the surface according to the adapted ablation path.

DESCRIPTION

FIGS. 1-8 illustrate systems and methods for optimized-coverage selective laser ablation. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labelled with numbers consistent among the figures. Like numbers in each of the figures, and the corresponding elements, may not be discussed in detail herein with reference to each of the figures. Similarly, all elements may not be labelled or shown in each of the figures, but reference numerals associated therewith may be used for consistency. Elements, components, and/or features that are discussed with reference to one or more of the figures may be included in and/or used with any of the figures without departing from the scope of the present disclosure.

Figure 1:
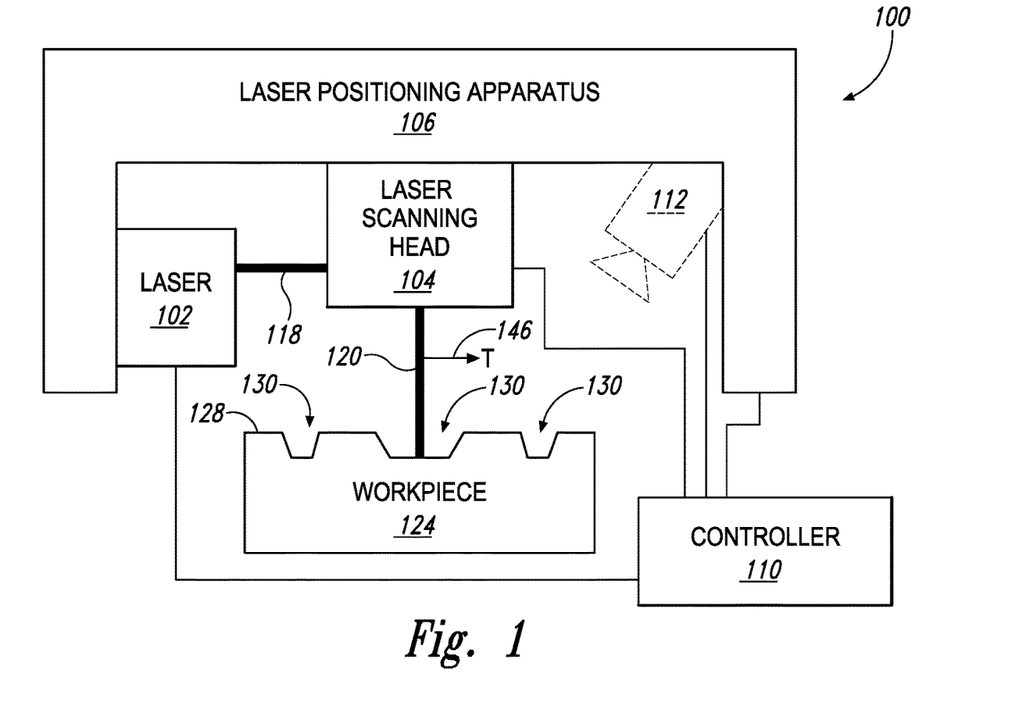
FIG. 1 is a schematic block diagram of a laser ablation system according to the present disclosure.
Figure 2:
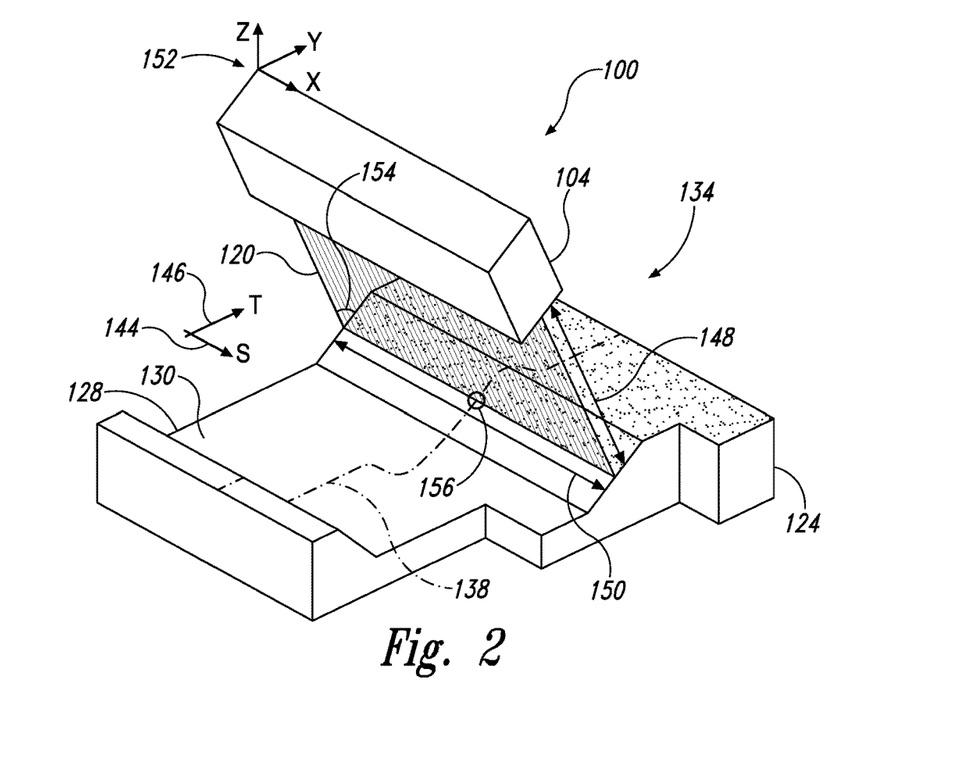
FIG. 2 is a schematic perspective view of an example laser ablation system ablating a surface.

As schematically represented in FIGS. 1 and 2, laser ablation system 100 is configured to clean or refresh surface 128 of workpiece 124 by applying laser sheet 120 to surface 128 (i.e., to ablate surface 128 by laser ablation). Laser ablation system 100 includes laser 102, laser scanning head 104, and laser positioning apparatus 106. Laser ablation system 100 also includes controller 110 that is generally configured to control laser 102, laser scanning head 104, and/or laser positioning apparatus 106.

Laser 102 is configured to emit laser beam 118. Laser scanning head 104 is configured to receive laser beam 118 and to deliver laser beam 118 as laser sheet 120 to surface 128 of workpiece 124 (to ablate surface 128). Laser scanning head 104 is configured to adjust and/or select scan width 150 (FIG. 2) of laser sheet 120. Scan width 150 is width of laser sheet 120 incident on surface 128 and generally extends in scan direction 144. Laser positioning apparatus 106 is configured to adjust the position of laser sheet 120 relative to the surface 128, at least in traverse direction 146. One or both of laser scanning head 104 and laser positioning apparatus 106 are configured to adjust and/or select laser sheet orientation 154 (FIG. 2) relative to surface 128. Laser sheet orientation 154 includes the angle of incidence of laser sheet 120 on surface 128 (at center of laser sheet 120, indicated as waypoint location 156) and includes the relative angle of scan width 150 with respect to scan direction 144 (i.e., the angle that scan width 150 makes in the plane of scan direction 144 and traverse direction 146). Laser scanning head 104 may be configured to adjust and/or select the relative position of laser sheet 120 on surface 128.

In conventional laser ablation, the laser is operated with constant operation parameters (e.g., scan width and laser sheet orientation) and scanned over a rectangular region of the surface to be ablated. The laser is scanned in a raster fashion with a constant speed and with each scan line (laser sheet) having a constant scan width. If the region of interest (where ablation is desired) is non-rectangular, irregular, or has significant 3D features, conventional laser ablation will apply too much power and/or energy in some areas, and/or not enough power and/or energy in other areas.

In FIGS. 1 and 2, surface 128 is illustrated with ridges and/or troughs as examples of irregular features and/or significant 3D features. Additionally or alternatively, surface 128 may have a non-rectangular profile (as illustrated in the example of FIG. 2). For a conventional laser ablation system to ablate surface 128 of the example in FIG. 1, the laser may be scanned (in traverse direction 146) across the ridges/troughs at a constant speed, leading to too little power and energy deposited along the walls at the edges of the ridges/troughs. Further processing may be required to fully prepare the under ablated walls by laser ablation. Moreover, non-rectangular profiles of surfaces may lead to applying laser power and energy beyond the edges of the surface, which may over ablate support structures for the workpiece that has the ablated surface. The time to over ablate a region, the time to reprocess the surface (needed because of under ablation) and the time to scan beyond the surface all reduce the efficiency of ablation processing (adding unnecessary time to the total time to ablate the surface).

Surface 128 is a surface of workpiece 124 to be cleaned or refreshed by laser ablation by laser ablation system 100. Workpiece 124 is a workpiece of laser ablation system 100 and not necessarily a structure in the process of being formed. Examples of workpiece 124 include a mold, a form, a mandrel, a vehicle, a structural component, and elements thereof. Generally, workpiece 124 includes hard and/or resilient materials such as metal and/or ceramic. Surface 128 may be a substantially metal and/or ceramic surface. Workpiece 124 and/or surface 128 may include polymeric materials, glasses, and/or composite materials. For example, workpiece 124 may include carbon fiber-reinforced polymer. Surface 128 and/or workpiece 124 may be large, e.g., all or a portion of a vehicle such as an aircraft fuselage, or a mold to form all or a portion of a component such as a wing of an aircraft. Surface 128 may have a surface area that is greater than 5 m$^2$ (square meters), greater than 10 m$^2$, greater than 20 m$^2$, and/or less than 200 m$^2$. Surface 128 may have a length (longest dimension) that is greater than 2 m (meters), greater than 5 m, greater than 10 m, and/or less than 100 m.

Surface 128 may include one or more areas 130 that are each a contiguous surface region of surface 128. Laser ablation system 100 and/or controller 110 are configured to ablate areas 130 of surface 128. Combined, all of areas 130 are not necessarily the entirety of surface 128 or the entirety of one or more faces, facets, and/or planes of surface 128. That is, laser ablation system 100 may be configured to laser ablate a portion of surface 128 as designated by the collective areas 130. Each of areas 130 may be laser ablated with different ablation parameters. Regions of surface 128 outside of areas 130 may be designated as excluded, or exclusion zones, where no ablation is to take place.

Areas 130 are each a distinct region of surface 128. Areas 130 may be contiguous with each other, one or more areas 130 may be separate from other areas 130, and/or two or more areas 130 may partially overlap. Laser sheet 120 is directed by laser ablation system 100 (e.g., by laser positioning apparatus 106) to move substantially continuously and sequentially among areas 130. Hence, completion of one of areas 130 generally is followed by the start of another of areas 130 until all of areas 130 are scanned.

Laser ablation system 100 is configured specifically to accommodate irregular surface shapes and/or surface projections (i.e., non-planar shapes and/or non-rectangular projections). That is, surface 128 and/or at least one of areas 130 may be non-planar and/or may have a non-rectangular outline (the outline being the 2D (two dimensional) projection in a direction parallel to the average surface normal of respective surface 128 and/or area 130, e.g., the projection into the plane of scan direction 144 and traverse direction 146). Hence, surface 128 may be referred to as a 3D surface and/or a surface with 3D features.

Controller 110 is a computing device, as described further herein, and may be programmed to perform one or more of methods described further herein. Controller 110 is programmed to perform coverage planning of surface 128 by laser sheet 120. This coverage planning process seeks to ensure that sufficient laser energy and power are used to efficiently ablate surface 128 while mitigating and/or minimizing over ablation and ablation outside of designated areas 130. Coverage planning includes generating a preliminary ablation path 136 (a series of waypoints 134; e.g., FIG. 3) and adjusting ablation parameters of one or more of waypoints 134 to achieve acceptable laser ablation across the entire ablation path (optionally adding or deleting waypoints 134). The adjustment of ablation parameters is referred to generally as optimization, though some embodiments may utilize techniques that are not computational optimizations and/or that are not iterative. The adjustment of ablation parameters is based on a 3D virtual model of surface 128 and/or areas 130 and results in adapted ablation path 138 (a series of waypoints 134 that have been adjusted relative to preliminary ablation path 136; e.g., FIG. 4). Controller 110 is programmed to receive the 3D virtual model of surface 128 (and/or areas 130), to generate preliminary ablation path 136 of laser sheet 120 across surface 128, to optimize (adjust) preliminary ablation path 136 to produce adapted ablation path 138, and/or to ablate surface 128 with laser sheet 120 according to adapted ablation path 138.

The 3D virtual model of surface 128 (and/or areas 130) may be an electronic description of surfaces, boundaries, and/or points that describe surface 128 and/or workpiece 124. For example, the 3D virtual model may be a CAD (computer aided design) model, a boundary representation, and/or a surface tessellation. The 3D virtual model may be a model of surface 128 and/or workpiece 124 as designed, as manufactured, and/or as used (i.e., a model based upon the actual surface 128 and/or workpiece 124, rather than a model based upon the intended design).

The 3D virtual model may indicate and/or may designate one or more areas 130. The 3D virtual model may be associated with a target amount of ablation for the entire surface 128. Additionally or alternatively, areas 130 may be associated with target amounts of ablation. Each area 130 may have the same target. Individual areas 130 or groups of areas 130 may have different targets.

The 3D virtual model may be based upon an image of surface 128 (or other measurement of surface 128). The image (or other measurement) of surface 128 may provide information on the shape and/or structure of surface 128 as actually present on surface 128. 3D virtual models based on design data may not reflect the present shape and/or structure of surface 128 after manufacture or use.

The 3D virtual model may facilitate determining positions and/or orientations of laser scanning head 104 relative to surface 128. For example, the 3D virtual model may be used to establish and/or maintain laser sheet orientation 154, scan spacing 148, and/or other controllable parameters as described further herein.

Controller 110 may receive the 3D virtual model from a database of virtual workpieces or other repository of 3D virtual models, optionally based upon a request (directly or indirectly) from an operator of laser ablation system 100. Controller 110 may receive the 3D virtual model upon detection of workpiece 124 sited at laser ablation system 100 (e.g., an image indicating workpiece 124 is positioned to be ablated).

Controller 110 is programmed to generate preliminary ablation path 136. Preliminary ablation path 136 is an ablation path based upon basic or simple representations of surface 128 and/or requirements for adequate ablation of surface 128. Preliminary ablation path 136 may be based upon a standard sized and shaped workpiece, and/or may be based upon the 3D virtual model.

Figure 3:
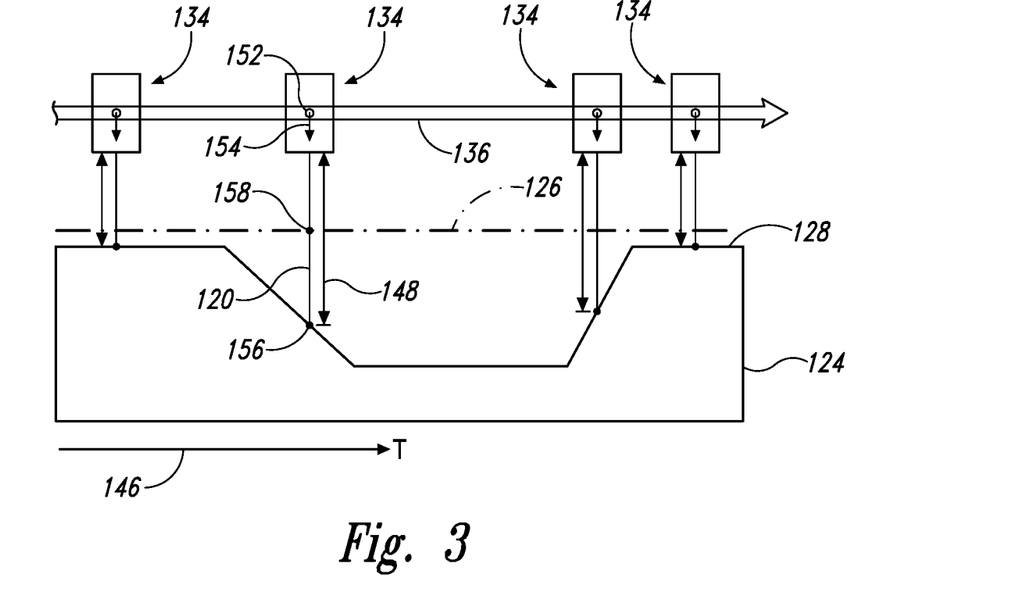
FIG. 3 is a schematic side view of an example laser ablation system illustrating a preliminary ablation path.

As illustrated in FIG. 3, preliminary ablation path 136 is a series of waypoints 134 through which laser sheet 120 would move to ablate surface 128. Each waypoint 134 is characterized by adjustable and/or selectable ablation parameters such as waypoint location 156, scan width 150, laser head position 152, laser sheet orientation 154, and scan spacing 148.

Figure 4:
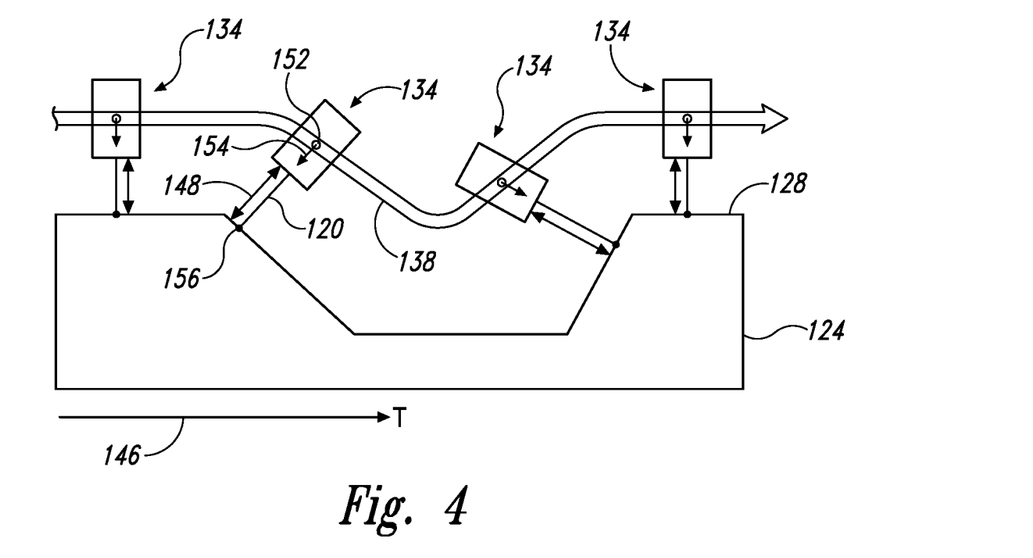
FIG. 4 is a schematic side view of an example laser ablation system illustrating an adapted ablation path.

Preliminary ablation path 136 may be a sequence of scans between waypoints 134 in traverse direction 146 that would cover 2D projection 126 of surface 128. 2D projection 126 is a projection of surface 128 in a direction parallel to the average surface normal of surface 128 (or nominal surface normal), e.g., the projection into the plane of scan direction 144 and traverse direction 146. In FIGS. 3 and 4, scan direction 144 is not illustrated as it would be perpendicular to the page. Because 2D projection 126 is planar, uniformly covering 2D projection 126 with laser sheet 120 would not uniformly cover surface 128 (which has 3D features).

Preliminary ablation path 136 may formed of waypoints 134 with uniform, default, minimum, and/or maximum values for one or more parameter types. For example, waypoints 134 of preliminary ablation path 136 may be uniformly distributed along 2D projection 126 (i.e., projected locations 158 are uniformly distributed). As other examples, waypoints 134 of preliminary ablation path 136 may have a uniform scan width 150 (e.g., the maximum scan width, the minimum scan width, or a nominal scan width). Waypoints 134 of preliminary ablation path 136 may have laser sheet orientations 154 that are all normal (perpendicular) to 2D projection 126. Uniform values may have a coefficient of variance of less than 10% unless otherwise specified.

Waypoints 134 may be densely spaced across surface 128 and/or 2D projection 126, to adequately cover surface 128 and/or 2D projection 126. Additionally or alternatively, large numbers of waypoints 134 may permit more fine control of ablation paths (preliminary ablation path 136 and/or adapted ablation path 138). Waypoint locations 156 and/or projected locations 158 of neighboring ones of waypoints (i.e., the next and previous waypoints 134 of the series of waypoints 134) may be separated by less than 200 mm, less than 100 mm, or less than 50 mm on the respective surface 128 and/or 2D projection 126.

Waypoint location 156 and projected location 158 are the locations of the cross-sectional center of laser sheet 120 on respective surface 128 and 2D projection 126. Waypoint location 156 may be characterized by the 3D position (i.e., Cartesian coordinates) of the cross-sectional center of laser sheet 120 on surface 128 and/or may be characterized by a relative 2D surface coordinate of the cross-sectional center of laser sheet 120 on surface 128. Projected location 158 may be characterized by the 3D position (i.e., Cartesian coordinates) of the cross-section center of laser sheet 120 in 2D projection 126 of surface 128 and/or may be characterized by a relative 2D surface coordinate of the cross-sectional center of laser sheet 120 in 2D projection 126 (i.e., the 2D location in the plane of 2D projection 126). Additionally or alternatively, waypoint location 156 and projected location 158 may be characterized by local coordinates of one or more components that affect waypoint location 156 and projected location 158, i.e., laser positioning apparatus 106, laser scanning head 104, and/or positioning components thereof. For example, a particular waypoint location 156 may correspond to particular motor and/or stage positions of laser positioning apparatus 106.

Laser sheet orientation 154 includes the angular orientation of the cross-sectional center of laser sheet 120 relative to surface 128 at waypoint location 156 (or relative to 2D projection 126 at projected location 158 for waypoints 134 of preliminary ablation path 136 in some embodiments). Laser sheet orientation 154 also includes the angular orientation of scan width 150 of laser sheet 120 relative to scan direction 144 (i.e., the angle that scan width 150 makes in the plane of scan direction 144 and traverse direction 146). Laser sheet orientation 154 may be characterized by angular positions of laser sheet 120 relative to surface 128 (or 2D projection 126) such as roll, pitch, and yaw. Laser sheet orientation 154 may be at least partially controlled by laser scanning head 104 and/or laser positioning apparatus 106. For example, in some embodiments, laser scanning head 104 may emit laser sheet 120 at a fixed, or static, orientation relative to laser scanning head 104. In such embodiments, laser positioning apparatus 106 may fully control laser sheet orientation 154. As another example, laser scanning head 104 may be capable of tilting laser sheet 120 relative to laser scanning head 104 over a limited range of tilt angles. In such embodiments, laser positioning apparatus 106 may control a global orientation and laser scanning head 104 may control a local orientation relative to the global orientation. Hence, laser sheet orientation 154 may be characterized by local orientations (e.g., roll, pitch, and/or yaw) of both laser scanning head 104 and laser positioning apparatus 106. Additionally or alternatively, laser sheet orientation 154 may be characterized by local coordinates of one or more components that affect laser sheet orientation 154. For example, a particular laser sheet orientation 154 may correspond to particular motor and/or stage positions of laser positioning apparatus 106 and/or laser scanning head 104.

Laser head position 152 generally corresponds to waypoint location 156 and/or projected location 158 but is the 3D position of laser scanning head 104 and not the laser sheet 120. Laser sheet 120 is emitted from laser scanning head 104 and may be positioned in scan direction 144 and/or traverse direction 146 by laser scanning head 104. That is, the local position of waypoint location 156 and/or projected location 158 may be controlled by laser scanning head 104 (generally within a limited range). Laser head position 152 is controlled by laser positioning apparatus 106 and determines the global position of waypoint location 156 (within which laser scanning head 104 may determine the local position of waypoint location 156). Laser head position 152 may be characterized by a reference position of laser scanning head 104 relative to global coordinates of laser ablation system 100. Additionally or alternatively, laser head position 152 may be characterized by local coordinates of laser positioning apparatus 106 and/or components thereof. For example, a particular laser head position 152 may correspond to particular motor and/or stage positions of laser positioning apparatus 106.

Scan spacing 148 is the distance between laser scanning head 104 (where laser sheet 120 is emitted) and surface 128 (or 2D projection 126 for waypoints 134 of preliminary ablation path 136 in some embodiments). Scan spacing 148 is characterized by the distance between waypoint location 156 (or projected location 158) and the cross-sectional center of laser sheet 120 as laser sheet 120 emerges from laser scanning head 104. Scan spacing 148 may be characterized by laser head position 152 and/or underlying coordinates that characterized laser head position 152.

Scan spacing 148 may specify and/or establish clear space between laser scanning head 104 and surface 128. Additionally or alternatively, scan spacing 148 may relate to ablation efficiency. In some embodiments, laser sheet 120 has a focal length at which the laser energy and power is most concentrated. Placing surface 128 at the focal length (i.e., making scan spacing 148 substantially equal to the focal length) may deposit the largest amount of energy and power from laser sheet 120 (for a given laser sheet orientation 154).

Cleaning effectiveness, also referred to as ablation effectiveness, is the rate of ablation at a particular location on surface 128, i.e., the amount of ablation achieved per unit time. Hence, cleaning effectiveness incorporates the amount of ablation and the speed of ablation. Generally, cleaning effectiveness at a particular location is affected by (and thus may be recited to include) laser energy, laser power, laser fluence (surface density of laser energy), laser irradiance (surface density of laser power), and residence time of laser sheet 120 at the particular location on surface 128. Laser parameters such as average power, repetition rate, pulse width, peak power, wavelength, etc. affect ablation efficiency. Changing scan spacing 148 may affect ablation efficiency by focusing more or less laser energy and/or power on surface 128, and, hence, changing laser fluence and/or laser irradiance. Changing scan width 150 may affect ablation efficiency by changing the area impinged by laser sheet 120, energy in laser sheet 120, and/or power in laser sheet 120 (depending on how laser sheet 120 is formed, e.g., by scanning laser beam 118 at a constant speed). Hence, changing scan width 150 may change laser energy, laser power, laser fluence, and/or laser irradiance. Changing laser head positions 152 and/or the distance between waypoint locations 156 may affect ablation efficiency by changing residence time of laser sheet 120, thus changing laser energy, laser power, laser fluence, and/or laser irradiance. Changing laser sheet orientation 154, in particular angle of incidence of laser sheet 120 may affect the surface area impinged by laser sheet 120 and, hence, laser fluence and/or laser irradiance.

Controller 110 is programmed to optimize (adjust) preliminary ablation path 136 to achieve a more efficient ablation of surface 128 than what preliminary ablation path 136 would provide. This optimization adapts preliminary ablation path 136 (based on a simple model of surface 128 and/or ablation constraints) to the actual surface 128 and ablation constraints (e.g., accounting for 3D geometry, non-rectangular surface profile, variance in target ablation in different areas 130, and/or zones of surface 128 not to be ablated). Optimization may include identifying if the preliminary ablation path 136 is acceptable (e.g., sufficiently efficient). Provided that the preliminary ablation path 136 is not acceptable, controller 110 may generate an adapted ablation path 138 (based on optimizing waypoints 134 of preliminary ablation path 136 to achieve an acceptable solution), as schematically represented in FIG. 4.

Generally, optimization may modify scan spacing 148, scan width 150, laser head position 152, laser sheet orientation 154, and/or waypoint location 156 for each waypoint 134. The optimization target generally is complete coverage of the designated areas 130 (e.g., the entire surface 128) with acceptable levels of ablation across areas 130, with little to no ablation outside areas 130, and with acceptable (e.g., at least locally minimal) time to ablate the covered areas 130.

Complete coverage may be characterized by the fraction of areas 130 that receive laser energy, laser power, laser fluence (surface density of laser energy), and/or laser irradiance (surface density of laser power) within a target range (which may be different for one or more of areas 130). Geometrical aspects of coverage (i.e., which regions of surface 128 receive any laser energy) may be affected by waypoint locations 156, laser head position 152, and/or scan width 150, and generally to a lesser degree by laser sheet orientation 154 and/or scan spacing 148. Ablation efficiency aspects of coverage (i.e., reception of sufficient laser energy, etc.) may be affected by laser sheet orientation 154 (in particular angle of incidence) and/or scan spacing 148, and to a lesser degree by scan width 150 (narrower or wider scan widths 150 may influence surface densities of laser energy and/or power).

Ablation outside areas 130 may be characterized by the total (and/or total relative) surface area ablated outside of areas 130. The total relative surface area may be relative to the total of surface areas of areas 130. Ablation outside areas 130 may be characterized by the total amount of energy and/or power delivered to regions outside areas 130. The total amount of energy and/or power may be assessed as the amount at each point that is greater than a given threshold (which may vary according to location). For example, optimization may be more sensitive to ablation in exclusion zones of surface 128 (zones not part of areas 130) by having a low threshold in the exclusion zones, relative to other locations not part of surface 128. Ablation outside areas 130 may be affected by waypoint location 156, laser sheet orientation 154, laser head position 152, scan width 150, and/or scan spacing 148.

Acceptable time to ablate the covered areas 130 may be characterized by the total time to process the surface 128 (all of areas 130), the differential or relative processing time of adapted ablation path 138 to preliminary ablation path 136. Acceptable time to ablate the covered areas 130 may be characterized by total motion of all actuators of laser ablation system 100 (or one or more components thereof such as laser positioning apparatus 106 and laser scanning head 104). Total motion may be assessed by total electrical current used. Acceptable time to ablate the covered areas 130 may be affected by waypoint location 156, laser sheet orientation 154, laser head position 152, scan width 150, and/or scan spacing 148.

Optimization may be performed using any of various non-linear optimization algorithms such as gradient descent, stochastic optimization, sequential quadratic programming, etc. The optimization problem may take the form:

$$\min_{\vec{q}} f(\vec{q}) = g(\vec{q}) + \sum_{n=1}^{N} h(\vec{q}(n)) \qquad \text{Eq. 1}$$

Where $\vec{q}$ is an ablation path with N waypoints and $\vec{q}(n)$ refers to the $n_{th}$ waypoint in $\vec{q}$; $h(\vec{q}(n))$ is a waypoint cost function that returns the cost of a particular waypoint (e.g., time spent at that waypoint); and $g(\vec{q})$ is a path cost function that returns the cost of the entire path as a whole (e.g., a measure of coverage of the designated areas 130 with acceptable levels of ablation). Optimization may be implemented as a minimization problem or a maximization problem. Waypoint and cost path functions may incorporate any of the measures, thresholds, and/or targets that may achieve the desired optimization target.

Optimization of waypoints 134 may be referred to as re-planning the ablation path and may involve non-iterative and/or non-optimization techniques (i.e., techniques that are not computational optimizations). For example, controller 110 may be programmed to identify waypoints 134 in which the energy applied would be beyond a tolerance range (i.e., greater than or less than the tolerance range). For those waypoints 134 in the preliminary ablation path 136 with unacceptable energy, controller 110 may be configured to adjust laser sheet orientation 154, scan spacing 148, and/or scan width 150 to achieve the target energy.

During the optimization process, each of the parameters being adjusted may be limited to a valid range. For example, scan width 150 may have a maximum value and a minimum value that correspond to physical limits of laser scanning head 104.

Controller 110 may be programmed to cause laser scanning head 104 to move laser sheet 120 across surface 128 by sequentially applying the parameters of the series of waypoints 134 of adapted ablation path 138. That is, laser 102, laser scanning head 104, and laser positioning apparatus 106 are operated to achieve scan spacing 148, scan width 150, laser head position 152, laser sheet orientation 154, and waypoint location 156 for each waypoint 134 of adapted ablation path 138. Between waypoints 134, waypoint parameters (each individually) may be continuously or discontinuously changed. For example, a first scan width 150 of a first waypoint 134 may be maintained as laser positioning apparatus 106 transitions waypoint locations 156 from first waypoint 134 to a second waypoint 134. After achieving the second waypoint location 156 of the second waypoint 134, scan width 150 may be set to the second scan width 150.

Controller 110 may be programmed to cause laser scanning head 104 to move laser sheet 120 across surface 128 with scan spacing 148 separating laser scanning head 104 from area 130 of surface 128. Scan spacing 148 between laser scanning head 104 and surface 128 may provide clearance and/or avoid contact between laser scanning head 104 and surface 128. Scan spacing 148 may be at focal point of laser sheet 120 or laser beam(s) that form laser sheet 120.

Scan spacing 148, separating laser scanning head 104 from surface 128, may be substantially constant for a group (optionally all) of waypoints 134. Substantially constant (or uniform) scan spacing 148 for two or more waypoints 134 may establish a substantially constant (or uniform) laser sheet spot area at those waypoints 134. For each of waypoints 134, scan spacing 148 may be substantially constant (or uniform), though different ones of waypoints 134 may be scanned with different scan spacing 148 values. Scan spacing 148 (and hence possibly the laser-beam spot area) may be optimized for each one of waypoints 134 independently.

Controller 110 may be programmed to cause laser scanning head 104 to move laser sheet 120 across surface 128 with an angle of incidence substantially normal to surface 128 at one or more waypoints 134 (i.e., normal to surface 128 at respective waypoint locations 156). Applying laser sheet at a perpendicular (normal) angle of incidence may provide for effective ablation at the selected location(s) of surface 128. Laser sheet 120 may have higher (or maximum) target irradiance when laser sheet 120 is oriented normal to surface 128 (at respective waypoint locations 156). If laser sheet 120 impinges surface 128 at an angle significantly different from normal (perpendicular), the beam area of laser sheet 120 may distort and become larger (thus reducing fluence and irradiance, and, hence, ablation efficiency). As used herein, a normal angle of incidence is approximately perpendicular to surface 128 (at about 90°, e.g., within the range of 80°-90°, inclusive).

Laser 102 is configured to provide laser beam 118 with wavelength, energy, and/or power configured to ablate surface 128. For example, laser 102 may emit UV (ultraviolet), visible, NIR (near infrared), and/or IR (infrared) light. Examples of laser 102 include a gas laser, a solid state laser, a fiber laser, a carbon dioxide laser, and a neodymium-glass laser. Laser 102 may have a continuous or temporally modulated output. For example, laser 102 may be a continuous-wave laser (CW laser), a pulsed laser (e.g., being mode locked, cavity dumped, Q switched, etc.), and/or may include a gate, shutter, chopper, electro-optical cell, an acousto-optical cell, etc. to impose temporal structure in laser sheet 120.

Laser 102 may emit laser beam 118 having temporal structure that may be in the form of pulses. A pulsed laser, a mode-locked laser, and a Q-switched laser intrinsically emit a pulsed laser beam. Pulsed laser beams may have a much higher peak power than average power. The peak power of a pulsed laser beam is inversely related to the duty cycle of the laser beam (the laser pulse width relative to the laser repetition period). For pulsed laser output, the laser pulse width, as used herein, is the full width of a pulse at half maximum intensity. A pulsed laser beam may have a duty cycle of less than 0.001 and, hence, may have a peak power greater than 1,000 times the average power. High peak powers may lead to high irradiances and, hence, high cleaning effectiveness and/or short laser ablation times.

Laser 102 is configured to provide laser beam 118 to laser scanning head 104. For example, laser 102 may be optically coupled to laser scanning head 104 via at least one of a fiber optic or a free-space optical path. A fiber optic or a free-space optical path may permit motion of laser scanning head 104 relative to laser 102. Additionally or alternatively, a fiber optic or a free-space optical path may permit laser 102 to be located remote from laser scanning head 104, laser positioning apparatus 106, and/or workpiece 124. Laser 102 and/or workpiece 124 may be large objects. Laser 102 generally is a high powered laser and may use specialized electrical connections and/or cooling apparatuses. Remote location may facilitate access to workpiece 124, laser positioning apparatus 106, laser scanning head 104, and/or laser 102. Remote location may facilitate utility access to laser 102 (e.g., cooling water and/or electrical connection).

Laser 102 may be mechanically coupled and/or supported to laser positioning apparatus 106. Being coupled and/or supported may facilitate a compact design of laser ablation system 100. Additionally or alternatively, being coupled and/or supported may facilitate optical routing of laser beam 118 from laser 102 to laser scanning head 104 that may be positioned by laser positioning apparatus 106.

Laser scanning head 104 is configured to receive laser beam 118 emitted from laser 102 and to direct laser beam 118 into laser sheet 120 and onto surface 128 of workpiece 124. Laser scanning head 104 is configured to create laser sheet 120 with a selectable scan width 150. Laser scanning head 104 may include optics (e.g., reflective, refractive, and/or diffractive optics) to direct laser beam 118 and to form laser sheet 120. In some embodiments, laser sheet 120 is formed by scanning laser beam 118 in a line, e.g., with a laser scanning apparatus such as a mirror galvanometer and/or a polygonal mirror. A polygonal mirror may be used to produce a consistent scan speed over relatively constant scan width 150. A mirror galvanometer may be used to independently address different locations along scan width 150 and/or to select different scan widths 150 for each of waypoints 134.

In embodiments where laser beam 118 is scanned along scan width 150, the scan speed generally is much faster than the traverse speed (the speed at which laser sheet 120 is swept across surface 128). Laser sheet 120 may be formed of laser beam 118 scanning scan width 150 at a repetition rate of greater than 10 scans/second, greater than 50 scans/second, or greater than 200 scans/second. Additionally or alternatively, laser beam 118 may be scanned across surface 128 with a surface velocity of at least 1 m/s (meters per second), at least 5 m/s, or at least 20 m/s.

Laser scanning head 104 typically is configured to optically form laser sheet 120 because optical techniques are generally much faster than mechanical techniques. In addition or alternate to optical scanning, laser scanning head 104 may diffract or otherwise disperse laser beam 118 from laser 102 into a wide, continuous beam that forms laser sheet 120. Further, laser scanning head 104 may split laser beam 118 from laser 102 into multiple beamlets that are distributed in a scan line to form laser sheet 120.

Laser sheet 120 has a sheet profile (cross section) with a width being the scan width 150 and a breadth being much narrower (e.g., a width of 100 mm (millimeters) and a breadth of 10 μm (microns)). Typical aspect ratios of laser sheet width to breadth are at least 100 or at least 1,000. The width of laser sheet 120 is generally aligned in scan direction 144. The center of laser sheet 120 as it impinges surface 128 is the relevant location of laser sheet 120 on surface 128 (e.g., waypoint location 156).

The scanning of laser beam 118 is generally along the scan direction 144. However, laser sheet 120 and the scan line (where laser sheet 120 impinges surface 128) are not necessarily planar and/or straight. For example, the scan line may be an arc, a curve, and/or a segmented line formed on a planar surface.

Laser positioning apparatus 106 is configured to sweep laser sheet 120 in traverse direction 146 across surface 128 by adjusting the relative position of surface 128 and laser scanning head 104 (which delivers laser sheet 120 to surface 128). Laser positioning apparatus 106 may adjust the relative position according to the desired traverse scan speed for each of waypoints 134.

Laser positioning apparatus 106 may move laser scanning head 104 and/or workpiece 124 to achieve the relative motion of laser sheet 120 with respect to surface 128. Laser positioning apparatus 106 may include a gantry, stage, rail, robotic positioner, etc. to move laser scanning head 104 and/or workpiece 124. Laser positioning apparatus 106 is configured for automatic operation and may be configured for versatile positioning. A gantry permits relatively arbitrary positioning of laser scanning head 104 relative to an open support space. A gantry permits positioning over a large distance and may accommodate large and/or complex workpiece geometries. As examples of large and/or complex geometries, workpiece 124 may be an aircraft wing or a mold to form a fuselage section. A robotic positioner (also referred to as a robotic arm) permits relatively arbitrary positioning of laser scanning head 104 relative to an open support space. A robotic positioner permits positioning over a large volume and may accommodate large and/or complex workpiece geometries.

Laser positioning apparatus 106 may be configured to support and/or move other components of laser ablation system 100 (e.g., laser 102 and/or controller 110).

Motion in scan direction 144 (e.g., due to laser scanning head 104) may be independent of motion in traverse direction 146 (e.g., due to laser positioning apparatus 106). For example, scan speed and traverse speed may be varied independently. As another example, scan speed and traverse speed may be independent of the location of laser sheet 120 relative to surface 128.

Laser ablation system 100 may comprise machine vision system 112, configured to image surface 128. That is, machine vision system 112 may produce an image of surface 128. Machine vision system 112 may automatically collect images of surface 128 and/or provide images of surface 128 as it is situated with respect to laser ablation system 100. Machine vision system 112 may be used to acquire images for alignment of workpiece 124 and/or surface 128. Machine vision system 112 may be controlled by controller 110. Integrating machine vision system 112 within laser ablation system 100 may facilitate alignment of surface 128 and/or acquisition of the image to create the 3D virtual model of surface 128.

Controller 110 may be programmed to cause machine vision system 112 to acquire an image of surface 128 and to identify a location and an orientation of surface 128 in a coordinate system of laser ablation system 100 based at least in part upon the image of surface 128, acquired by machine vision system 112. For example, the image or images from machine vision system 112 may identify the alignment of workpiece 124 and/or surface 128 with respect to laser positioning apparatus 106 and/or laser ablation system 100.

Machine vision system 112 may be positioned in a known location and/or orientation with respect to other components of laser ablation system 100. Additionally or alternatively, machine vision system 112 may be configured to image surface 128 with reference fiducials or other markers in the image frame. The known location, known orientation, reference fiducials, and/or other markers provide a reference to establish and/or relate to the coordinate system of laser ablation system 100.

Figure 5:
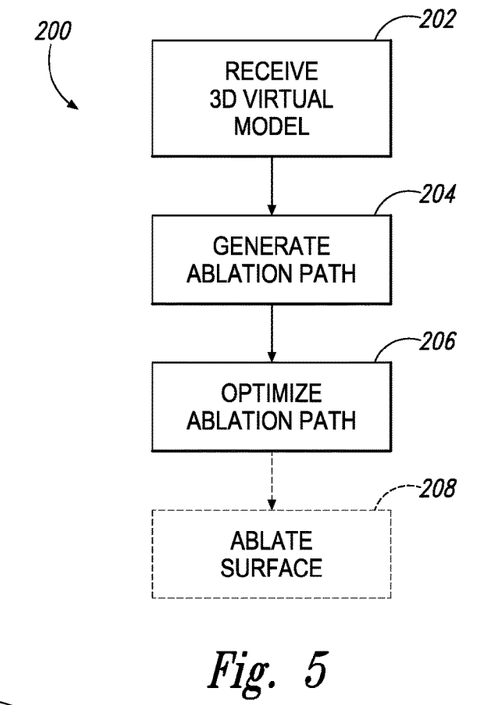
FIG. 5 is a schematic diagram of methods of laser ablation according to the present disclosure.

FIG. 5 schematically represents methods 200 of laser ablation surface preparation (e.g., preparation of one or more areas 130 of surface 128 of workpiece 124). Methods 200 include receiving 202 a 3D virtual model (as discussed herein) of the surface to be ablated, generating 204 a preliminary ablation path (such as preliminary ablation path 136), and optimizing 206 (adjusting) the preliminary ablation path to produce an adapted ablation path (such as adapted ablation path 138). Methods 200 may include ablating 208 the surface according to the adapted ablation path (e.g., controlling a laser ablation system, such as laser ablation system 100, to ablate the surface according to the adapted ablation path). Methods 200, receiving 202, generating 204, optimizing 206, and/or ablating 208 may be performed by a controller such as controller 110.

Receiving 202 the 3D virtual model may include retrieving the 3D virtual model from a database of virtual workpieces or other repository of 3D virtual models. Receiving 202 may be in response to receiving a request (directly or indirectly) from the controller and/or an operator of the laser ablation system. Receiving 202 may be in response determining the presence and/or identity of a workpiece to be ablated (e.g., detecting the workpiece sited at the laser ablation system).

Generating 204 the preliminary ablation path includes generating a series of waypoints (such as waypoints 134) to define the preliminary ablation path. The preliminary ablation path is configured to substantially or completely expose the surface with a laser sheet to ablate the surface. The preliminary ablation path generally is an ablation path based upon basic or simple representations of the surface to be ablated and/or the requirements for adequate ablation of the surface. For example, the preliminary ablation path may be based on a standard sized and shaped workpiece. As another example, preliminary ablation path may be based on a 2D projection (such as 2D projection 126) of the surface to be ablated. In some embodiments, the preliminary ablation path is based upon the 3D virtual model. Because the preliminary ablation path may be based upon basic or simplified representations of the surface and/or ablation requirements, ablating the surface according to the preliminary ablation path would imperfectly ablate the surface (e.g., over ablate regions, under ablate regions, fail to fully cover the areas, and/or perform slowly).

Waypoints of the preliminary ablation path may be generally uniformly spaced across the surface and/or the 2D projection of the surface. The waypoints may be arranged in a simple raster path across the surface and/or 2D projection (and/or across each of the areas 130 or corresponding 2D projections of areas). The waypoints may be densely spaced across the surface and/or the 2D projection of the surface. For example, the separations between neighboring waypoint locations (such as waypoint locations 156) and/or between neighboring projected locations (such as projected locations 158) may be less than 200 mm, less than 100 mm, or less than 50 mm on the respective surface to be ablated and/or the 2D projection of the surface to be ablated.

Waypoints of the preliminary ablation path may be configured to produce a generally uniform amount of cleaning effectiveness at each of the waypoint locations (or projected locations) of the ablation path (e.g., based on the basic or simple representation of the surface to be ablated). Waypoints are configured to produce a cleaning effectiveness by selecting, determining, and/or adjusting one or more of a laser head position (such as laser head position 152), a laser sheet orientation (such as laser sheet orientation 154), a scan width of the laser sheet (such as scan width 150 or laser sheet 120), or a scan spacing between the laser head and the surface (such as scan spacing 148 between laser scanning head 104 and the surface). The target cleaning effectiveness for each waypoint may be defined by a uniform target cleaning effectiveness and/or a predetermined tolerance limit that defines a range of acceptable cleaning effectiveness values. The predefined tolerance limit may define a coefficient of variance of less than 20%, less than 10%, or less than 5% among all of the waypoints.

Waypoints of the preliminary ablation path may be configured such that the angles of incidence and/or laser sheet orientations (such as laser sheet orientations 154) are normal to (or perpendicular to, or substantially perpendicular to) the 2D projection of the surface to be ablated. Additionally or alternatively, the waypoints of the preliminary ablation path may be configured such that the angles of incidence and/or laser sheet orientations are normal to (or perpendicular to, or substantially perpendicular to) the surface to be ablated.

Waypoints of the preliminary ablation path may have uniform, default, minimum, and/or maximum values for one or more parameter types. For example, the waypoints have a uniform scan width (e.g., the maximum scan width, the minimum scan width, or a nominal scan width).

Optimizing 206 (adjusting) the preliminary ablation path produces the adapted ablation path which achieves a more efficient ablation of the surface (i.e., at the one or more designated areas) than what the preliminary ablation path would provide. The target or goal of optimizing 206 is complete coverage of the designated areas (e.g., the entire surface) with acceptable levels of ablation, with little to no ablation outside the designated areas, and with acceptable (e.g., at least locally minimal) time to ablate the designated areas. Optimizing 206 generally includes performing optimization as described with respect to controller 110. For example, optimizing 206 may employ non-linear optimization algorithms such as gradient descent, stochastic optimization, sequential quadratic programming, etc.

Optimizing 206 the preliminary ablation path to produce the adapted ablation path adjusts the waypoints of the preliminary ablation path to produce adjusted waypoints that form the adapted ablation path. Optimizing 206 may change the laser head position, the laser sheet orientation, the scan width, the waypoint location, and/or the scan spacing of one or more waypoints of the preliminary ablation path. Additionally or alternatively, optimizing 206 may add or delete waypoints. In the adapted ablation path, the waypoints collectively are arranged to provide sufficient coverage of the designated areas of the surface at a sufficient cleaning effectiveness and performed in an acceptable (typically minimum) total ablation time.

Optimizing 206 may include optimizing the uniformity of and/or achieving a uniformity target for cleaning effectiveness, laser fluence, and/or laser irradiance (each of which may be optimized for uniformity within one or more areas of the surface). Further, optimizing 206 may include optimizing ablation coverage and/or total time to ablate (individual areas, a group of areas, and/or all the areas of the surface). Uniformity may be established by all waypoints having a nominal value of the associated parameter or by all waypoints have a value within a range of values, such as a predetermined tolerance limit. The predefined tolerance limit may define a coefficient of variance of less than 20%, less than 10%, or less than 5% among all of the waypoints of the adapted ablation path.

Optimizing 206 may include optimizing the uniformity of and/or achieving a uniformity target for scan spacing (e.g., laser sheet focus) and/or laser sheet orientation (e.g., angle of incidence). Additionally or alternatively, optimizing 206 may include achieving a target scan spacing (e.g., all waypoints within a target tolerance limit) and/or achieving a target laser sheet orientation (e.g., all waypoints within a target tolerance limit). For scan spacing, the target scan spacing and the corresponding target tolerance limit may be related to the focal point of the laser sheet. For laser sheet orientation, the target laser sheet orientation and the corresponding target tolerance limit may be related to the normal (perpendicular) angle of incidence of the laser sheet.

Optimizing 206 may include identifying and/or determining if the preliminary ablation path is acceptable (e.g., sufficiently efficient). Optimizing 206 may be performed in response to such identifying and/or determining to generate an adapted ablation path that is acceptable (e.g., sufficiently efficient). Acceptability criteria may include the cleaning effectiveness at one or more of the waypoint locations of the preliminary ablation path being outside a predetermined tolerance limit. The predetermined tolerance limit may define a coefficient of variance of less than 20%, less than 10%, or less than 5% among all the waypoints of the preliminary ablation path. The predetermined tolerance limit may define a minimum acceptable ablation amount and/or a maximum acceptable ablation amount.

Figure 6:
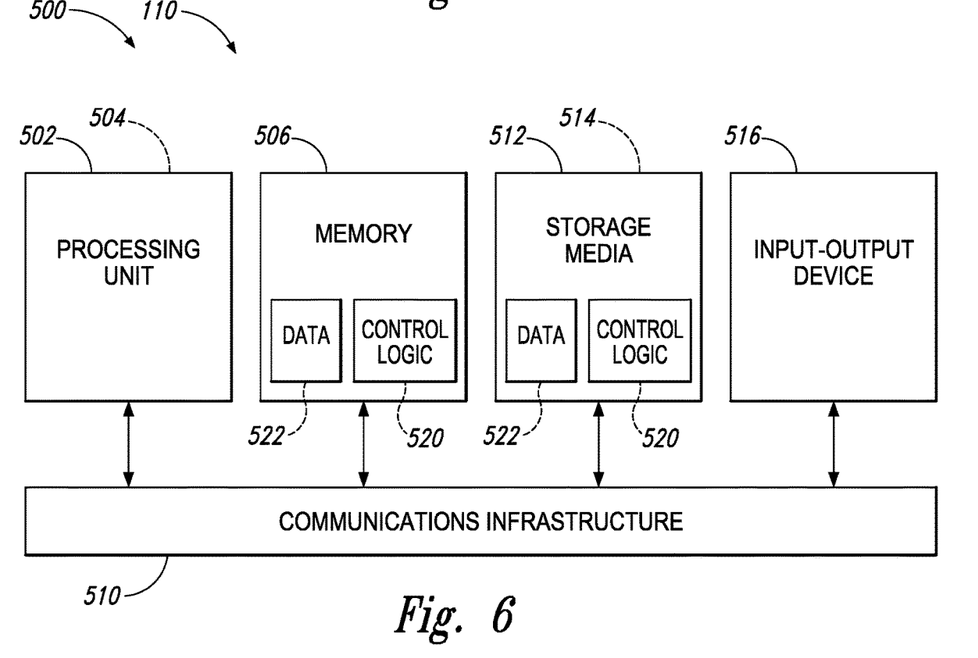
FIG. 6 is a schematic diagram of computing devices according to the present disclosure.

FIG. 6 schematically represents a computing device 500 that may be used to implement and/or instantiate the methods, components, and features described herein. For example, the controller 110 may include, and/or may be, one of the computing devices 500. The computing device 500 includes a processing unit 502 operatively coupled to a computer-readable memory 506 by a communications infrastructure 510. The processing unit 502 may include one or more computer processors 504 and may include a distributed group of computer processors 504. The processing unit 502 may include, or be implemented on, programmable, reconfigurable, and/or dedicated hardware such as field-programmable gate arrays, digital signal processors, and/or application specific integrated circuits.

The computing device 500 also may include a computer-readable storage media assemblage 512 that is operatively coupled to the processing unit 502 and/or the computer-readable memory 506, e.g., by communications infrastructure 510. The computer-readable storage media assemblage 512 may include one or more non-transitory computer-readable storage media 514 and may include a distributed group of non-transitory computer-readable storage media 514. The computer-readable memory 506, the computer-readable storage media assemblage 512, and the non-transitory computer-readable storage media 514 are each computer readable media. Computer-readable media are tangible and are not merely transitory signals.

The communications infrastructure 510 may include a local data bus, a communication interface, and/or a network interface (e.g., a personal-area network interface, a local-area network interface, a wide-area network interface, and/or an Internet interface). The communications infrastructure 510 may be configured to transmit and/or to receive signals, such as electrical, electromagnetic, optical, and/or acoustic signals.

The computing device 500 may include one or more input-output devices 516 operatively coupled to the processing unit 502, the computer-readable memory 506, and/or the computer-readable storage media assemblage 512. Input-output devices 516 may be configured for visual, audio, and/or tactile input and/or output from or to the user or operator of the computing device 500. Each input-output device 516 independently may be configured for only input, only output, primarily input, primarily output, and/or a combination of input and output. Examples of input-output devices 516 include monitors (e.g., video monitor), displays (e.g., alphanumeric displays, lamps, and/or LEDs), keyboards, pointing devices (e.g., mice), touch screens, speakers, buzzers, and controls (e.g., buttons, knobs, etc.).

The computing device 500 may include a distributed group of components, which each may be interconnected directly or indirectly. Thus, the computing device 500 may include one or more processing units 502, computer-readable memories 506, computer-readable storage media assemblages 512, and/or input-output devices 516.

One or both of the computer-readable memory 506 and the computer-readable storage media assemblage 512 include control logic 520 and/or data 522. Control logic 520 (which may also be referred to as software, firmware, gateware, and/or hardware) may include instructions and/or information that, when executed by the processing unit 502, cause the computing device 500 to perform one or more of the methods described herein. Control logic 520 and/or data 522 may include applications (e.g., a control application), resources, access controls, and/or associated information.

Where the controller 110 is described as performing one or more functions, the controller 110 is configured, e.g., programmed, to perform the function(s). The respective device may include one or more programs, modules, and/or components configured, e.g., programmed, to perform the function(s) when the programs, modules, and/or components are executed by the processing unit 502 or otherwise operated by the computing device 500. The control logic 520 and/or data 522 may include instructions and/or information corresponding to the programs, modules, and/or components.

Figures 7, 8:
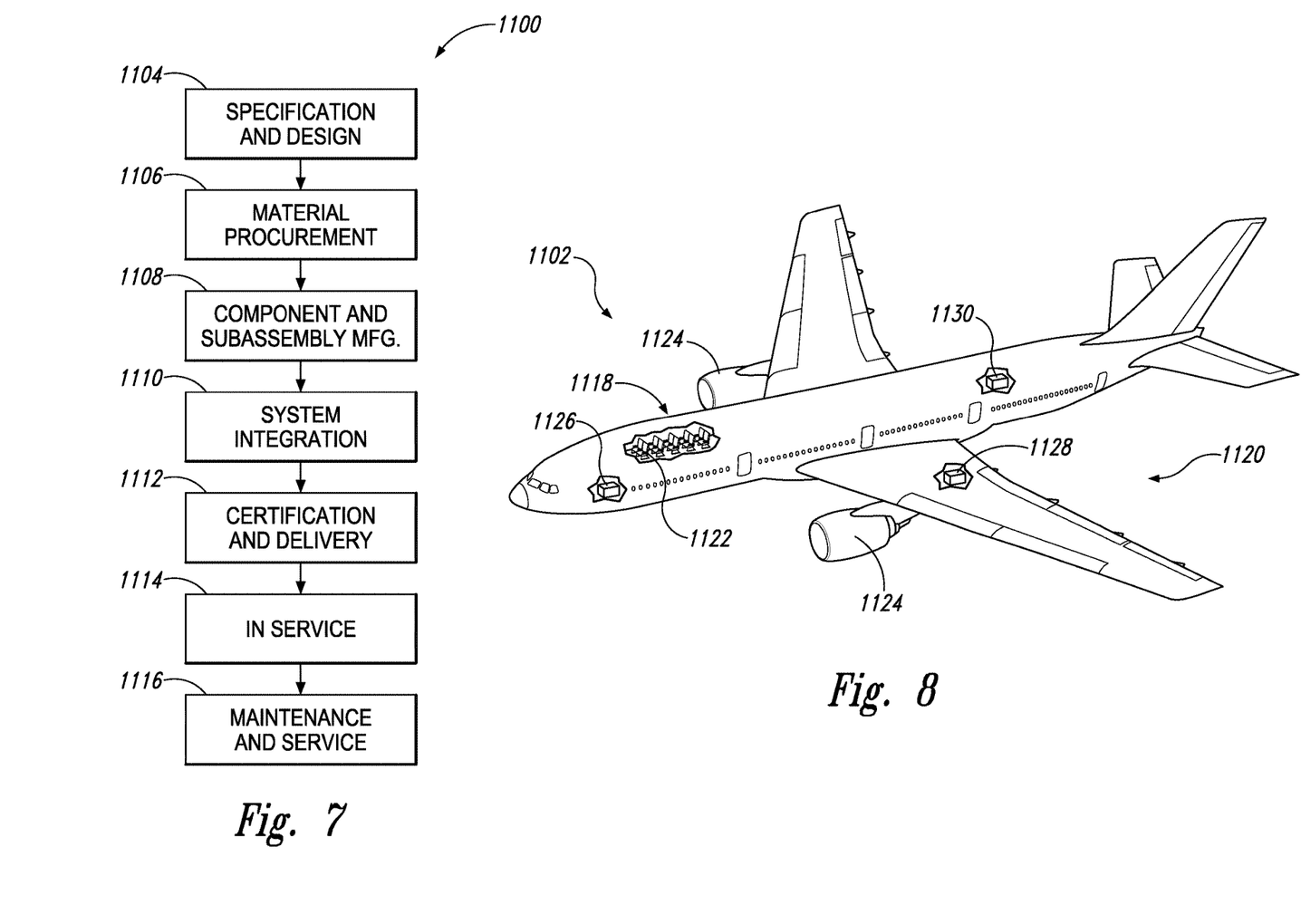
FIG. 7 is a block diagram of aircraft production and service methodology.
FIG. 8 is a schematic illustration of an aircraft.

Devices and methods of the present disclosure may be described in the context of an aircraft manufacturing and service method 1100 as shown in FIG. 7 and an aircraft 1102 as shown in FIG. 8. During pre-production, illustrative method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116 (which may also include modification, reconfiguration, refurbishment, and so on).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 1102 produced by illustrative method 1100 may include an airframe 1118 with a plurality of systems 1120 and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry. Accordingly, in addition to aircraft 1102, the principles disclosed herein may apply to other vehicles, e.g., land vehicles, marine vehicles, space vehicles, etc.

Apparatus and methods embodied herein may be employed during any one or more of the stages of the production and service method 1100. For example, components or subassemblies corresponding to production process 1108 may be fabricated or manufactured in a manner similar to components or subassemblies produced while the aircraft 1102 is in service. Also, one or more apparatus embodiments, method embodiments, or a combination thereof may be utilized during the production stages 1108 and 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation, to maintenance and service 1116.

Examples of inventive subject matter according to the present disclosure are described in the following enumerated paragraphs.

A1. A laser ablation system (100) comprising:
    a laser (102), configured to emit a laser beam (118);
    a laser scanning head (104), configured to deliver the laser beam (118) as a laser sheet (120) onto a surface (128);
    a laser positioning apparatus (106), configured to adjust relative positions of the surface (128) and the laser sheet (120); and
    a controller (110) that is programmed:
        to receive a 3D virtual model of the surface (128);
        to generate a series of waypoints (134) to form a preliminary ablation path (136) of the laser sheet (120) across the surface (128), wherein each of the waypoints (134) is associated with a waypoint location (156) of the laser sheet (120) on the surface (128) and includes a laser head position (152), a laser sheet orientation (154), and a scan width (150);
        to optimize the preliminary ablation path (136) to produce an adapted ablation path (138) of the laser sheet (120) across the surface (128) based upon the laser head position (152), the laser sheet orientation (154), and the scan width (150) of each waypoint (134);
        to ablate the surface (128) by scanning the laser sheet (120) relative to the surface (128) according to the adapted ablation path (138).

A2. The laser ablation system (100) of paragraph A1, wherein the laser positioning apparatus (106) comprises at least one of a gantry or a robotic positioner.

A3. The laser ablation system (100) of any of paragraphs A1-A2, wherein the laser scanning head (104) comprises at least one of a polygonal mirror or a mirror galvanometer.

A4. The laser ablation system (100) of any of paragraphs A1-A3, wherein the laser (102) is optically coupled to the laser scanning head (104) via at least one of a fiber optic or a free-space optical path.

A5. The laser ablation system (100) of any of paragraphs A1-A4, wherein the laser (102) is mechanically coupled to the laser positioning apparatus (106).

A6. The laser ablation system (100) of any of paragraphs A1-A5, wherein the laser (102) is at least one of a pulsed laser, a mode-locked laser, and a Q-switched laser.

A7. The laser ablation system (100) of any of paragraphs A1-A6, wherein the laser sheet (120) is configured to ablate the surface (128).

A8. The laser ablation system (100) of any of paragraphs A1-A7, wherein the 3D virtual model of the surface (128) is based upon an image of the surface (128).

A8.1. The laser ablation system (100) of paragraph A8, further comprising a machine vision system (112), configured to image the surface (128), and wherein the image of the surface (128) is acquired by the machine vision system (112).

A9. The laser ablation system (100) of any of paragraphs A1-A8.1, further comprising a machine vision system (112) and wherein the controller (110) is further programmed to cause the machine vision system (112) to acquire an image of the surface (128) and to identify a location and an orientation of the surface (128) in a coordinate system of the laser ablation system (100) based at least in part upon the image of the surface (128), acquired by the machine vision system (112).

A10. The laser ablation system (100) of any of paragraphs A1-A9, wherein each of the waypoints (134) has a scan spacing (148) separating the laser scanning head (104) from the respective waypoint location (156) on the surface (128).

A10.1. The laser ablation system (100) of paragraph A10, wherein the scan spacing (148) of each of the waypoints (134) is uniform.

A11. The laser ablation system (100) of any of paragraphs A1-A10.1, wherein the controller (110) is programmed to cause the laser scanning head (104) to move the laser sheet (120) across the surface (128) with an angle of incidence normal to each one of the waypoint locations (156).

A12. The laser ablation system (100) of any of paragraphs A1-A11, wherein the surface (128) is a surface of a workpiece (124) and optionally wherein the workpiece (124) is a mold, a form, a mandrel, a vehicle, and/or a structural component.

A13. The laser ablation system (100) of any of paragraphs A1-A12, wherein the surface (128) is composed of one or more of a metal, a ceramic, a polymeric material, a glass, a composite material, or a carbon fiber-reinforced polymer.

A14. The laser ablation system (100) of any of paragraphs A1-A13, wherein the surface (128) has a surface area that is greater than 5 $m^2$, greater than 10 $m^2$, greater than 20 $m^2$, and/or less than 200 $m^2$.

A15. The laser ablation system (100) of any of paragraphs A1-A14, wherein the surface (128) has a length that is greater than 2 m, greater than 5 m, greater than 10 m, and/or less than 100 m.

B1. A method (200) of laser ablation surface preparation of a three-dimensional surface, the method comprising:
    receiving (202) a 3D virtual model of a surface (128) to be ablated;
    generating (204) a series of waypoints (134) to form a preliminary ablation path (136) across the surface (128), wherein each of the waypoints (134) is associated with a waypoint location (156) on the surface (128) and includes a laser head position (152), a laser sheet orientation (154), and a scan width (150);
    optimizing (206) the preliminary ablation path (136) to produce an adapted ablation path (138) based upon the laser head position (152), the laser sheet orientation (154), and the scan width (150) of each waypoint (134); and
    ablating (208) the surface (128) according to the adapted ablation path (138).

B2. The method (200) of paragraph B1, wherein at least a portion of the method is performed with the laser ablation system (100) of any of paragraphs A1-A15.

B3. The method (200) of any of paragraphs B1-B2, wherein the preliminary ablation path (136) is a raster path across the surface (128).

B4. The method (200) of any of paragraphs B1-B3, wherein the generating (204) includes generating the series of waypoints (134) to form the preliminary ablation path (136) across a two-dimensional projection (126) of the surface (128).

B5. The method (200) of any of paragraphs B1-B4, wherein neighboring ones of the waypoint locations (156) of the series of waypoints (134) are separated on the surface (128) by less than 200 mm, less than 100 mm, or less than 50 mm.

B6. The method (200) of any of paragraphs B1-B5, wherein each waypoint location (156) corresponds to a projected location (158) on a/the two-dimensional projection (126) of the surface (128) and wherein neighboring ones of the projected locations (158) of the series of waypoints (134) are separated at the two-dimensional projection (126) of the surface (128) by less than 200 mm, less than 100 mm, or less than 50 mm.

B7. The method (200) of any of paragraphs B1-B6, wherein the laser head position (152), the laser sheet orientation (154), and the scan width (150) for each waypoint (134) are configured to produce an amount of cleaning effectiveness at each location across a/the two-dimensional projection (126) of the surface (128) that is within a predetermined tolerance limit.

B7.1. The method (200) of paragraph B7, wherein the amount of cleaning effectiveness at each location across the two-dimensional projection (126) of the surface (128) is uniform B7.2. The method (200) of any of paragraphs B7-B7.1, wherein the predetermined tolerance limit is a coefficient of variance of less than 20%, less than 10%, or less than 5%.

B7.3. The method (200) of any of paragraphs B7-B7.2, wherein the amount of cleaning effectiveness includes a laser fluence and/or a laser irradiance.

B8. The method (200) of any of paragraphs B1-B7.3, wherein the laser sheet orientation (154) of each of the waypoints (134) of the preliminary ablation path (136) is perpendicular to a/the two-dimensional projection (126) of the surface (128).

B9. The method (200) of any of paragraphs B1-B8, wherein the laser sheet orientation (154) of each of the waypoints (134) of the preliminary ablation path (136) is normal to the surface (128) at the waypoint location (156) of the corresponding waypoint (134).

B10. The method (200) of any of paragraphs B1-B9, wherein the optimizing (206) includes optimizing the preliminary ablation path (136) by controlling at least one of the laser head position (152), the laser sheet orientation (154), or the scan width (150) for one or more waypoints (134).

B11. The method (200) of any of paragraphs B1-B10, wherein the optimizing (206) includes optimizing the preliminary ablation path (136) by controlling the waypoint location (156) for one or more waypoints (134).

B12. The method (200) of any of paragraphs B1-B11, wherein the optimizing (206) includes optimizing at least one of cleaning effectiveness uniformity, laser fluence uniformity, laser irradiance uniformity, ablation coverage, or total time to ablate.

B13. The method (200) of any of paragraphs B1-B12, wherein the optimizing (206) is performed until an amount of cleaning effectiveness at all waypoints (134) is within a predetermined tolerance limit, and optionally wherein the predetermined tolerance limit is a coefficient of variance of less than 20%, less than 10%, or less than 5%.

B14. The method (200) of any of paragraphs B1-B13, wherein the optimizing (206) is performed provided that an amount of cleaning effectiveness at one or more of the waypoint locations (156) is outside a predetermined tolerance limit, and optionally wherein the amount of cleaning effectiveness includes a laser fluence and/or a laser irradiance.

B15. The method (200) of any of paragraphs B1-B14, further comprising determining that an amount of cleaning effectiveness at one or more of the waypoint locations (156) of the preliminary ablation path (136) is outside of a predetermined tolerance limit.

B15.1. The method (200) of paragraph B15, wherein the optimizing (206) is performed in response to the determining that the amount of cleaning effectiveness at one or more of the waypoint locations (156) of the preliminary ablation path (136) is outside of the predetermined tolerance limit.

B15.2. The method (200) of any of paragraphs B15-B15.1, wherein the amount of cleaning effectiveness includes a laser fluence and/or a laser irradiance.

B16. The method (200) of any of paragraphs B1-B15.2, wherein the laser sheet orientation (154) of each of the waypoints (134) of the adapted ablation path (138) is normal to the surface (128) at the waypoint location (156) of the corresponding waypoint (134).

B17. The method (200) of any of paragraphs B1-B16, wherein the scan spacing (148) of each of the waypoints (134) of the adapted ablation path (138) is uniform.

B18. The method (200) of any of paragraphs B1-B17, wherein the virtual model of the surface (128) is based upon an image of the surface (128).

B19. The method (200) of any of paragraphs B1-B18, wherein the surface (128) is a surface of a workpiece (124) and optionally wherein the workpiece (124) is a mold, a form, a mandrel, a vehicle, and/or a structural component.

B20. The method (200) of any of paragraphs B1-B19, wherein the surface (128) is composed of one or more of a metal, a ceramic, a polymeric material, a glass, a composite material, or a carbon fiber-reinforced polymer.

B21. The method (200) of any of paragraphs B1-B20, wherein the surface (128) has a surface area that is greater than 5 $m^2$, greater than 10 $m^2$, greater than 20 $m^2$, and/or less than 200 $m^2$.

B22. The method (200) of any of paragraphs B1-B21, wherein the surface (128) has a length that is greater than 2 m, greater than 5 m, greater than 10 m, and/or less than 100 m.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the singular forms "a", "an" and "the" may be intended to include the plural forms as well, unless the context clearly indicates otherwise.

The various disclosed elements of systems and steps of methods disclosed herein are not required of all systems and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of laser ablation surface preparation of a three-dimensional surface, the method comprising:
receiving a 3D virtual model of a surface to be ablated;
generating a series of waypoints to form a preliminary ablation path across the surface, wherein each of the waypoints is associated with a waypoint location on the surface and includes a laser head position, a laser sheet orientation, and a scan width;
optimizing the preliminary ablation path to produce an adapted ablation path based upon the laser head position, the laser sheet orientation, and the scan width of each waypoint; and
ablating the surface according to the adapted ablation path with a laser head; and
adjusting the scan width of the laser head during the ablating to match the scan width of each of the waypoints of the adapted ablation path, and independently varying one or more of a scan speed and a traverse speed of the laser head to maintain one or more of a laser fluence and a laser irradiance to within a desired range.

2. The method of claim 1, wherein the preliminary ablation path is a raster path across the surface.

3. The method of claim 1, wherein the generating includes generating the series of waypoints to form the preliminary ablation path across a two-dimensional projection of the surface.

4. The method of claim 1, wherein each waypoint location corresponds to a projected location on a two-dimensional projection of the surface and wherein neighboring ones of the projected locations of the series of waypoints are separated at the two-dimensional projection of the surface by less than 200 mm.

5. The method of claim 1, wherein the laser head position, the laser sheet orientation, and the scan width for each waypoint are configured to produce an amount of cleaning effectiveness at each location across a two-dimensional projection of the surface that is within a predetermined tolerance limit.

6. The method of claim 5, wherein the amount of cleaning effectiveness includes one or both of the laser fluence and the laser irradiance.

7. The method of claim 1, wherein the laser sheet orientation of each of the waypoints of the preliminary ablation path is perpendicular to a two-dimensional projection of the surface.

8. The method of claim 1, wherein the optimizing includes optimizing the preliminary ablation path by controlling at least one of the laser head position, the laser sheet orientation, or the scan width for one or more waypoints.

9. The method of claim 1, wherein the optimizing includes optimizing the preliminary ablation path by controlling the waypoint location for one or more waypoints.

10. The method of claim 1, wherein the optimizing includes optimizing one or both of ablation coverage and total time to ablate.

11. The method of claim 1, wherein the optimizing is performed until an amount of cleaning effectiveness at all waypoints is within a predetermined tolerance limit.

12. The method of claim 11, wherein the cleaning effectiveness at the waypoints is a rate of ablation at the waypoints, and wherein the rate of ablation includes one or more of the laser fluence and the laser irradiance, and wherein one or more of the laser fluence and the laser irradiance is estimated based on the scan width.

13. The method of claim 1, wherein the laser sheet orientation of each of the waypoints of the adapted ablation path is normal to the surface at the waypoint location of the corresponding waypoint.

14. The method of claim 1, wherein a scan spacing of between each of the waypoints of the adapted ablation path is uniform.

15. A laser ablation system comprising:
- a controller that is programmed to perform the method of claim 1;
- a laser, configured to emit a laser beam;
- the laser head, configured to deliver the laser beam as a laser sheet onto the surface; and
- a laser positioning apparatus, configured to adjust relative positions of the surface and the laser sheet.

16. The laser ablation system of claim 15, wherein the laser positioning apparatus comprises at least one of a gantry or a robotic positioner.

17. The laser ablation system of claim 15, wherein the surface is a surface of a workpiece that is a mold, a form, a mandrel, a vehicle, or a structural component.

18. The laser ablation system of claim 15, wherein the surface is composed of one or more of a metal, a ceramic, a polymeric material, a glass, a composite material, or a carbon fiber-reinforced polymer.

19. The laser ablation system of claim 15, wherein the 3D virtual model of the surface is based upon an image of the surface.

20. The laser ablation system of claim 15, further comprising a machine vision system and wherein the controller is further programmed to cause the machine vision system to acquire an image of the surface and to identify a location and an orientation of the surface in a coordinate system of the laser ablation system based at least in part upon the image of the surface, acquired by the machine vision system.

* * * * *

UNITED STATES PATENT AND TRADEMARK OFFICE
CERTIFICATE OF CORRECTION

PATENT NO. : 10,744,539 B2
APPLICATION NO. : 15/796128
DATED : August 18, 2020
INVENTOR(S) : Richard Charles Barclay, Trent T. Weiss and Philip Lawrence Freeman Page 1 of 1

It is certified that error appears in the above-identified patent and that said Letters Patent is hereby corrected as shown below:

In the Claims

Claim 14, Column 23, Line 1, remove "of" following "spacing"

Signed and Sealed this
Eighth Day of December, 2020

Andrei Iancu
*Director of the United States Patent and Trademark Office*